(12) United States Patent
Glow

(10) Patent No.: US 8,402,155 B2
(45) Date of Patent: Mar. 19, 2013

(54) REAL-TIME MEDIA DELIVERY WITH AUTOMATIC CATCH-UP

(75) Inventor: Andy Glow, Tampa, FL (US)

(73) Assignee: XCIRA, Inc., Tampa, FL (US)

( * ) Notice: Subject to any disclaimer, the term of this patent is extended or adjusted under 35 U.S.C. 154(b) by 137 days.

(21) Appl. No.: 12/752,478

(22) Filed: Apr. 1, 2010

(65) Prior Publication Data

US 2011/0246657 A1   Oct. 6, 2011

(51) Int. Cl.
  *G06F 15/16*  (2006.01)
  *H04N 7/173*  (2011.01)
  *G06F 15/173*  (2006.01)
  *G06F 15/177*  (2006.01)

(52) U.S. Cl. .......... 709/231; 709/234; 725/88; 725/102; 725/109

(58) Field of Classification Search .................. 709/231, 709/217–228, 234; 725/102, 109, 88
See application file for complete search history.

(56) References Cited

U.S. PATENT DOCUMENTS

| | | | |
|---|---|---|---|
| 8,027,560 B2 * | 9/2011 | Brady et al. | 386/203 |
| 2008/0187282 A1 * | 8/2008 | Brady et al. | 386/66 |
| 2008/0288518 A1 * | 11/2008 | Matsuo et al. | 707/101 |
| 2009/0287841 A1 * | 11/2009 | Chapweske et al. | 709/231 |
| 2010/0037263 A1 * | 2/2010 | Riley et al. | 725/50 |
| 2010/0290704 A1 * | 11/2010 | Christiansen | 382/173 |
| 2011/0125916 A9 * | 5/2011 | Dhuse et al. | 709/231 |
| 2011/0230987 A1 * | 9/2011 | Anguera Miro et al. | 700/94 |

* cited by examiner

*Primary Examiner* — Haresh N Patel
(74) *Attorney, Agent, or Firm* — Smith Risley Tempel Santos LLC; Gregory Scott Smith

(57) ABSTRACT

Live media content is delivered in substantially real-time to a player device from a streamer and through a content delivery network. The streamer receives live media content and encodes and streams the content over the content delivery network. The content delivery network is configured to provide minimal buffering. A player device accessing the streaming channel receives media frames and buffers the frames while rending the received frames in order of receipt. If the buffer is loaded to the point that the currently rendered data lags the actual live feed by more than a threshold amount of time, the player skips over one or more video frames to bring the rendered content more current. For instance, the buffer can be flushed and more recent content can be received from the content delivery network.

3 Claims, 3 Drawing Sheets

REAL-TIME MEDIA DELIVERY WITH AUTOMATIC CATCH-UP

BACKGROUND

The Internet, which started as a tool for the delivery of simple textual content, has now grown into a full-blown source of high-quality, multi-media content. With the incorporation of high-quality video and audio CODECs, and increased bandwidth over the Internet, high-definition video content can now be streamed to a user's personal computer for viewing. Content such as movies, television shows, commercials or the like are available to a user by simply accessing an appropriate URL or internet address through a player, such as a Flash Player. The video content is encoded at the audio video source end and then distributed through a streamer over one or more content delivery networks to one or more user devices. The user devices include a player which is configured to decode the stream and then render it on a display and speaker associated with or communicatively coupled to the user device.

Streaming content is basically multimedia content (i.e., audio, video, graphics, text or a combination of any of these) that flows in continuous pieces or packets, and is normally presented or rendered to an end-user while being delivered by a streaming provider. Thus the term "streaming" refers to the delivery method of the content rather than to the content itself. The distinction is usually applied to content that is distributed over telecommunications networks, as most other delivery systems are either inherently streaming (e.g., radio, television) or inherently non-streaming (e.g., books, video cassettes, audio CDs). The verb 'to stream' is also derived from this term, meaning to deliver media in this manner. Internet television is a commonly streamed media.

Attempts to display audio/video content on computers date back to the earliest days of computing in the mid-20th century. However, little progress was made for several decades, primarily due to the high cost and limited capabilities of computer hardware.

From the late 1980s through the 1990s, consumer-grade personal computers became powerful enough to display audio/video content. The primary technical issues related to the provision of audio/video content included:

having sufficient processing power and bus bandwidth to support the required data rates; and creating low-latency interrupt paths in the operating system (OS) to prevent under running or emptying out the buffer thereby invoking a delay while additional content was obtained.

Thus, as advances in technology addressed these issues, the provision of audio/video content was realized. Yet, despite the advances in technology, computer networks were still quite limited, and audio/video content was usually delivered over non-streaming channels, such as by downloading a digital file from a remote web server and then saving it to a local drive on the end user's computer or storing it as a digital file and playing it back from CD-ROMs.

During the late 1990s and early 2000s, Internet users saw great technological advancements in networking technology including:

large increases in network bandwidth, especially in the last mile;

increased access to networks, especially the Internet;

use of standard protocols and formats, such as TCP/IP, HTTP, and HTML; and commercialization of the Internet.

These advances in computer networking combined with powerful home computers and modern operating systems made streaming of audio/video content practical and affordable for ordinary consumers. Stand-alone Internet radio devices were developed to offer listeners a "no-computer" option for listening to audio streams.

In general, multimedia content has a large volume, so media storage and transmission costs are still significant; to offset this somewhat, media are generally compressed for both storage and streaming.

Increasing consumer demand for streaming of high definition (HD) content to different devices in the home has led the industry to develop a number of technologies, such as Wireless HD or ITU-T G.hn, which are optimized for streaming HD content without forcing the user to install new networking cables.

Although the present disclosure is focused on the delivery of video content, it should be appreciated what whenever, the term audio/video, video, or media is used, it should be implied to cover all instances of media type and combinations thereof unless explicitly limited to a particular media type.

A media stream can be streamed either live or on demand. Live streams are generally provided by a means called true streaming. True streaming sends the information straight to the computer or device without saving the file to a hard disk. On demand streaming is provided by a means called progressive streaming. Progressive streaming saves the file to a hard disk and then is played from that location. On demand streams are often saved to hard disks and servers for extended amounts of time; however, a live stream is typically only available at one time only (e.g. during a sporting event, show or speech). Streaming media storage size (in the common file system measurements megabytes, gigabytes, terabytes, and so on) is calculated from the streaming bandwidth and length of the media using the following formula (for a single user and file):

storage size (in megabytes)=length (in seconds)×bit rate (in bit/s)/(8×1024×1024) where 1 mebibyte=8×1024×1024 bits.

As an example, one hour of video encoded at 300 kbit/s (a typical broadband video in 2005 and it is usually encoded in a 320×240 pixels window size) would be:

(3,600 s×300,000 bit/s)/(8×1024×1024) or around 128 MiB of storage.

If the file is stored on a server for on-demand streaming and this stream is viewed by 1,000 people at the same time using a Unicast protocol, the bandwidth requirement is:

300 kbit/s×1,000=300,000 kbit/s=300 Mbit/s of bandwidth

This is equivalent to around 135 GB per hour. Of course, using a multicast protocol the server sends out only a single stream that is common to all users. Hence, such a stream would only use 300 kbit/s of serving bandwidth.

Designing a network protocol to support streaming media raises many issues. These issues include the type of protocol to use versus the type of service and content to be delivered. Datagram protocols, such as the User Datagram Protocol (UDP), send the media stream as a series of small packets. This is simple and efficient; however, there is no mechanism within the protocol to guarantee delivery. It is up to the receiving application to detect loss or corruption and recover data using error correction techniques. If data is lost, the stream may suffer a dropout.

The Real-time Streaming Protocol (RTSP), Real-time Transport Protocol (RTP) and the Real-time Transport Control Protocol (RTCP) were specifically designed to stream media over networks. RTSP runs over a variety of transport protocols, while the latter two are built on top of UDP.

Reliable protocols, such as the Transmission Control Protocol (TCP), guarantee correct delivery of each bit in the media stream. However, they accomplish this with a system of timeouts and retries, which makes them more complex to implement. It also means that when there is data loss on the network, the media stream stalls while the protocol handlers detect the loss and retransmit the missing data. Clients can minimize this effect by buffering data for display. While delay due to buffering is acceptable in video on demand scenarios, users of interactive applications such as video conferencing will experience a loss of fidelity if the delay that buffering contributes to exceeds 200 ms.

Unicast protocols send a separate copy of the media stream from the server to each recipient. Unicast is the norm for most Internet connections, but does not scale well when many users want to view the same program concurrently. Multicast protocols were developed to reduce the data replication (and consequent server/network loads) that occurs when many recipients receive unicast content streams independently. These protocols send a single stream from the source to a group of recipients. Depending on the network infrastructure and type, multicast transmission may or may not be feasible. One potential disadvantage of multicasting is the loss of video on demand functionality. Continuous streaming of radio or television material usually precludes the recipient's ability to control playback. However, this problem can be mitigated by elements such as caching servers, digital set-top boxes, and buffered media players.

The present disclosure is focused on the delivery of live media to a user over the Internet. Several factors can easily diminish the enjoyment of a user's experience when viewing video content over the Internet. In general, due to data transmission errors, bandwidth constraint (especially during high-volume times), latency, etc., the delivery audio/video content to a user can be choppy or stuttered. From a user's perspective, this can become quite annoying. For instance, if the traffic delays are too severe, a playback of the content may be paused while additional content is received by the user device. To overcome such issues, the use of buffering has been employed. By using buffering, a sufficient amount of content can be delivered and queued up in a user device or distribution node such that at all times, the next segment of content is readily available to the user device. Thus, when a sufficient amount of content is buffered up for delivery to the user device, if the delivery of subsequent packets are delayed, the buffer makes this appear seamless to the user who is able to view a steady stream of content by simply accessing the content that has been stored in the buffer. The buffers are generally set to be sufficiently large to mitigate any latency issues, or at least the most common latency issues that would disrupt the delivery of the audio/video content.

In most settings, such as watching sporting events, lectures, television shows, movies, etc., buffering of the audio and/or video content is an acceptable practice to provide consistent and pleasurable viewing experiences. However, it will be appreciated that in such situations, the content being viewed is actually skewed from the real-time generation of the audio/video content. For instance, a live sporting event may be 3-5 seconds ahead in real-time from the actual audio/video content that being viewed by a user over the Internet. Such delays are not noticeable or realizable from the user's perspective unless the user is also at the live event.

However, in some situations, it will be appreciated that such delays may not be acceptable by a user. For instance, if the user expects or is relying on the provision of real time audio/video but, the actually delivery is delayed by a number of seconds, the user may be adversely affected. As an example, if a remote surgeon is participating in an operation procedure, a delay of a few seconds could result in the loss of a patient. Many other examples may come to mind in which the real-time, un-delayed delivery of audio/video content is required.

One of the leading providers of audio/video playback software applications for personal computers is the FLASH PLAYER marketed by ADOBE. The FLASH PLAYER includes the decoding functions necessary to receive an audio/video stream and then render to a user interface, such as a browser window, for viewing and listening. Generally, a personal computer equipped with a FLASH PLAYER may interface with a delivery system, such as a content delivery network (CDN) or some other infrastructure or service provider or FLASH based infrastructure to receive streamed content over a specific channel. Although exemplary embodiments are described as interfacing or operating in conjunction with a CDN, it will be appreciated that any public or private network, as well as other communication infrastructures may also be employed. The specific channel is typically identified through the use of a URL or URL along with codes, passwords, identifiers, etc. The audio/video content is usually buffered at one level by the CDN and, the audio/video content delivered to the user device is also usually buffered.

In operation, using the FLASH PLAYER as an example, a user can enter information to identify a specific stream (such as entering or selecting a URL) and a connection is then established between the CDN and the FLASH PLAYER and, the delivery of the audio/video content is begun.

The protocol defining the interface between the FLASH PLAYER and the CDN includes several commands that can be used to control the delivery of the audio/video content.

As is well known in the art by those familiar with programming of modules, applications, etc. that interface with or interact with FLASH PLAYERS, the following commands are included in the FLASH protocol:

Interactive Flash Commands

| Command | Function |
| --- | --- |
| Play | Begins or resumes the playback of the audio/video stream |
| Stop | Pauses the playback of the audio/video stream until a Play command is issued again. |
| GoTo and Stop (Seek Stop) | The seek command is used to designate the frame or location in an audio/video stream to move forward or backwards to. For this command, the requested frame is loaded or moved to but, the playback of the content is halted. |
| GoTo and Play (Seek Play) | The seek command is used to designate the frame or location in an audio/video stream to move forward or backwards to. For this command, the requested frame is loaded and the content is buffered pre-roll and playback begins. |

Using such commands, a playback application, such as FLASH PLAYER, can build additional controls for the access, delivery and playback of audio/video content. For example, the following value for Get URL may instructs a player to seek to the specified time in the presentation timeline:

command:seek(time)

More specifically, the following command may instruct the player to seek to location 1:24.2 in a content timeline:

command:seek(1:24.2) where the time format could be defined as dd:hh:mm:ss.xyz with dd being days, hh being hours, mm being minutes, ss being seconds, x being tenths of seconds, y being hundredths of seconds, and z being milliseconds. Depending on the implementation, only some of the fields may be required. Further, if the time value does not include a decimal point, the player may read the last field as the seconds. For example, 1:30 could be interpreted as 1 minute and 30 seconds, whereas 1:30:00 could mean 1 hour and 30 minutes. Also, note that all of the following commands are equivalent with each seeking to the point 90 minutes into the audio/video content timeline:

command:seek(1:30:00.0)
command:seek(90:00)
command:seek(5400)

Playing, Pausing, or Stopping content delivery

The following commands can cause a player to play, pause, or stop the presentation, respectively:

command:play( )
command:pause( )
command:stop( )

Those skilled in the art will be familiar with other players and other software commands and controls for these players.

But, what is needed in the art is a player that is more suitable for the delivery of real-time audio/video content that is not delayed, or at least is minimally delayed.

BRIEF SUMMARY

In general, the various embodiments of a media delivery system and method operate to provide the real-time delivery of live media, such as video, audio and video, or other live or time sensitive media content by minimizing the lag time through the employment of an automatic catch-up feature. Operating within a player device, an embodiment can be summarized as operating to receive blocks of media content from a live feed over a content delivery network. For instance, the blocks of media content can be video frames, multiple video frames, or some other division or delivery mechanism for the media. Looking at video as a non-limiting example, the video content is buffered as received and rendered on a display device in the order of receipt. If the size of the buffer grows too large—indicating that there is a lag between the rendered video content and the live feed, then one or more blocks of video content are skipped over to decrease the lag time.

A system oriented embodiment includes a media capture device that is configured to capture live media and provide it to a streamer. The streamer, being communicatively coupled to the media capture device, is configured to encode the received media and deliver the encoded media to a distribution network or infrastructure, such as a content delivery network as a non-limiting example (i.e., as a streaming channel or the like). A user device including a media player and a display device is configured to send a request to the content delivery network for the reception of media content. The request includes an identifier associated with the encoded video content provided by the streamer. The user device then receives encoded media data, such as blocks or frames of data, from the content delivery network, decodes the data, stores the data in a buffer and renders the data to the display or other user interface device. The user device also operates to monitor the amount of data stored in the buffer. If the amount of data exceeds a threshold amount, then an operation is invoked to flush the buffer and reload with current data. For instance, if the system is set up to have a maximum lag time on the order of 0.6 seconds, then when the buffers is full to the equivalent of 0.6 seconds or more (in some embodiments) of content, then the buffer content is skipped or reduced to bring the lag time back into an acceptable range (i.e., 0.2 seconds in some embodiments). If the amount of time represented by the content in the buffer exceeds a threshold amount of time.

In some embodiments, an application server is included to help facilitate the setting up and creation of streaming channels. In such embodiments, the application server is configured to maintain information for each of the events that are being streamed. The application server receives or houses parameters defining the event and maintains this information for subsequent access. The user device is able to access the application server to obtain the parameters in forming a request for the delivery of media content from the content delivery network.

It will be appreciated that in a particular embodiment, the FLASH PLAYER available from ADOBE SYSTEMS is used as the player in the user device. In such an embodiment, the flushing of the buffer may be accomplished by issuing a seek command with appropriate parameters to decrease the lag time to an acceptable value. For instance, in an exemplary embodiment, the maximum lag time may be on the order of 0.6 seconds and the minimum buffer size on the order of 0.2 seconds. However, it will be appreciated that different parameters may be utilized depending on the desired user experience and the type of event that is being streamed. In one embodiment, then the buffer size reaches or exceeds 0.6 seconds, a seek command flushing at least 0.5 seconds can be issued to bring the lag down to 0.2 seconds. In other embodiments, multiple seek commands may be issued to gradually bring the lag time down to a desired value.

These and other embodiments are more fully described in the detailed description in view of the various drawings.

DETAILED DESCRIPTION OF EMBODIMENTS OF THE DISCLOSURE

Figure 1:
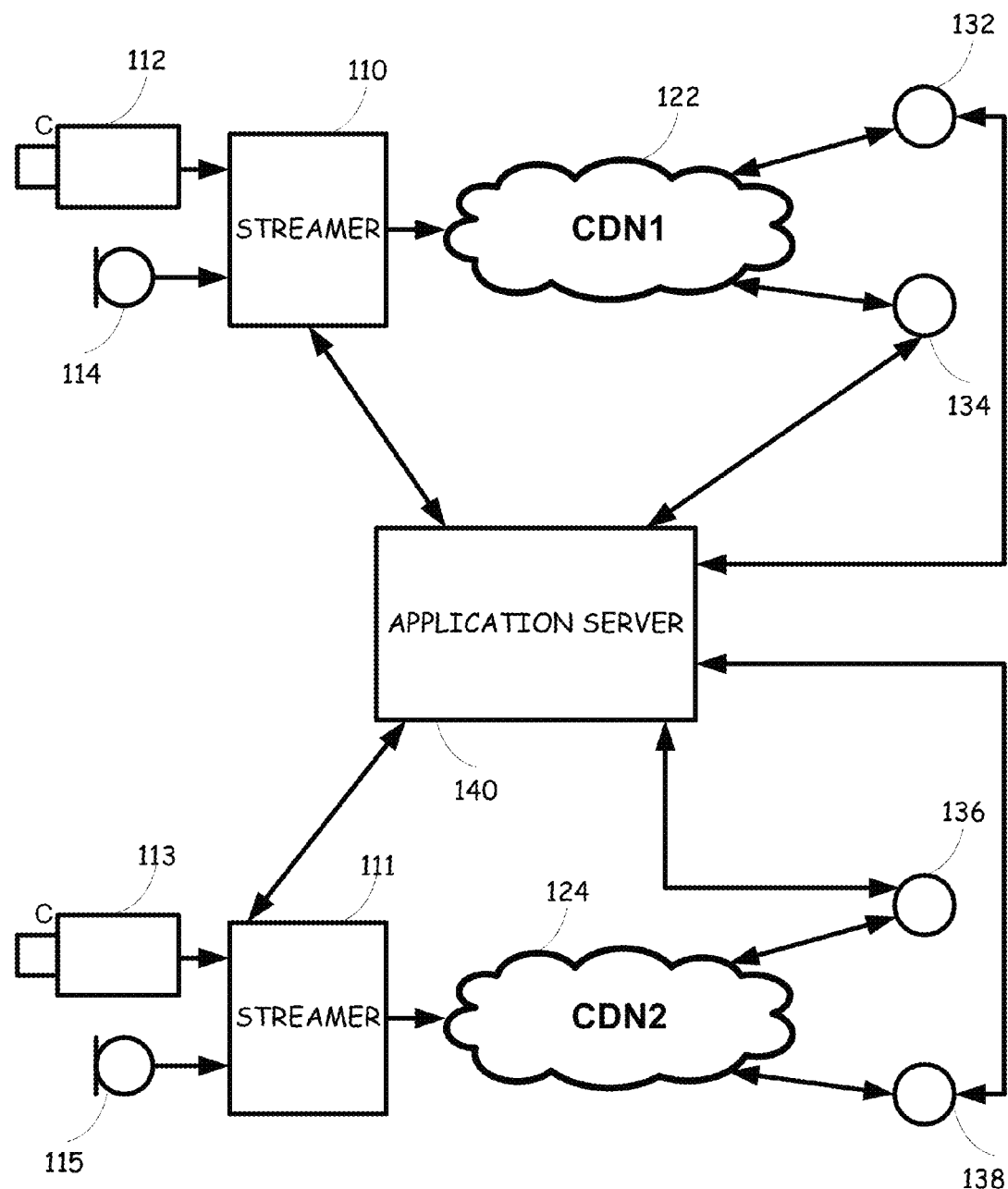
FIG. 1 is a block diagram illustrating various components in an exemplary environment for various embodiments.

The present disclosure, as well as features and aspects thereof, is directed towards providing a media player that provides real-time delivery of live media with a catch-up feature to correct for lagging between the live content and the received/rendered content. It should be noted that the term media used throughout this description may refer to video, audio, audio with video, data, or any other combination of these or other media types. A key aspect in the provision of streamed media is the use of buffers to smooth out the media delivery. However, reliance upon buffers also enables the development of lag between the content being rendered and the actual live feed. The present disclosure is directed towards a media player, and a media delivery system that places an emphasis on the delivery of current content in real-time in exchange for the quality of the media delivery. In one embodiment of the media delivery system, a streamer interfaces to media feeds and provides an encoded stream to a content delivery network. A player device then initiates the reception of the stream and then renders the received content in real-time by monitoring a local buffer and, if the lag between the delivered media and the live media is greater than a threshold amount, the buffer is flushed causing a media rendering jump as the media presented is brought current.

In general, an embodiment may include a streamer, a content delivery network, a player and an application server. In such an embodiment, a nexus is created between the streamer and player to enable the player to connect to or receive the media content from the correct streamer. In a typical embodiment, this nexus can be created through the use of the application server. The application server includes information that identifies the media stream by URL and/or a unique identifier. This information can initially be created by a user or operator and thus, loaded or entered into the application server or, the information may be more of a dynamic nature. For instance, a person initiating a media stream may access the application server and provide information to identify which streamer is to be associated with a particular event. In other embodiments, the streamer may dynamically access the application server, identify itself to the application server and allow the application server to create a link or pointer to that particular streamer. Yet in other embodiments, the streamer may include a link or short cut that when selected, associates the streamer with a particular event or data entry at the application server. Other techniques may also be used to create a nexus that allows a player to identify and select a particular media stream from a streamer but, regardless of the technique employed, the streamer is ultimately configured to create a stream or establish a streaming channel and provide the streaming media to a network or other distribution mechanism for reception by a player device. Further, the streamer interjects encoded media content into the distribution mechanism, such as a content delivery network for example. The player establishes a connection with the stream associated with a desired event, such as a live auction, a conference call or other live/interactive events. In establishing the connection, the player accesses the application server to identify and/or select to receive the media stream. Depending on the various embodiments, such process may include identifying which CDN, what settings, etc. Once the connection is established and video content is being received and rendered, the player monitors the buffer to detect if the lag exceeds a threshold value and if so, the player issues a command to the CDN to catch-up on the video feed. For instance, in an exemplary embodiment the monitor may check the buffer every 10 seconds and if the buffer includes 0.6 seconds or more of video content, then an adjustment can be initiated to bring the video feed more current (i.e., within 0.2 seconds).

In another embodiment, the video delivery system may simply include the modifications to the player that operate to monitor the buffer and make adjustments if the rendered video lags the actual live feed by a threshold amount.

FIG. 1 is a block diagram illustrating various components in an exemplary environment for various embodiments of a real-time video player with catch-up feature. In the illustrated environment, a streamer 110 is shown as interfacing with, or is otherwise communicatively coupled to, a media capture device 112, such as a video camera as a non-limiting example, and/or an audio capture device 114, such as a microphone. In a typical embodiment, the streamer 110 may include a computing platform including a media card for interfacing with the media capture device. For instance, the computing platform may include a video card that receives raw video fed from a video camera. The streamer 110 receives media content from the capture devices 112 and 114 and encodes the content for transfer, transmission or otherwise communicating the content towards end user devices over a network or other infrastructure, such as a content delivery network.

In the illustrated embodiment, the streamer 110 is shown as interfacing with, or is otherwise communicatively coupled to, an interface in a content delivery network CDN1 122 and an application server 140. On the other side, the CDN1 122 and the application server 140 also interface with, or are otherwise communicatively coupled with user devices 132 and 134. It will also be appreciated that multiple elements may be operating simultaneously to deliver various audio and/or video feeds such as through streamer 111 that interfaces with video source 113, audio source 115, an interface to the content delivery network CDN2 124, the application server 140 and ultimately to user devices 136 and 138.

The Streamer

Those skilled in the art will be familiar with streaming technology for media content. In essence, a streamer receives a raw feed of data, such as a video feed as a non-limiting example, and operates to digitize the feed (if necessary) and then encode the data including providing some form of compression prior to transmitting the encoded data as a series of packets, blocks, frames or some other unit over the network. There are multiple streamers available on the market generating streamed content in a variety of formats and quality levels. One example of a streamer is the engine available from ADOBE SYSTEMS. The Flash Media Server (FMS) is a proprietary data and media server from ADOBE SYSTEMS. This server works with the FLASH PLAYER runtime to create media driven, multiuser RIAs (Rich Internet Applications). The server uses ActionScript, an ECMAScript based scripting language, for server-side logic. Flash Media Server generally operates as a hub and FLAHS based applications connect to the hub using the Real Time Messaging Protocol (RTMP). The server can send and receive live media or data to and from the connected users, or stored data with live web FLV player installed. Connected clients can make Remote Procedure Calls (RPC) on the server-side and the server can call methods on specific clients. A SharedObject can be used to synchronize complicated data structures and call remote methods on multiple clients in one go by having clients subscribe to a shared object. Standard ActionScript objects may be transported across the NetConnection using the Action Message Format (AMF) which is handled transparently by the server and flash client.

The server also allows users to receive and publish net streams. When viewing a net stream the user can either create their own to view a remotely stored Flash Video (FLV) or the server can instantiate a net stream and play a video on it, the latter method means that every user will be at the same point in the video when they subscribe to it as they are all viewing the same stream. The server operates to deliver the streamed content through a network such as the content delivery network.

In exemplary embodiments, to limit latency in the delivery of the video frames, the streamer may be selected to provide lower quality of video feeds, such as by using a lower quality CODEC, lower resolution, etc.

Content Delivery Network

The streamed media can be delivered to a player device in a variety of manners ranging from a direct connect to a multi-node distributed network. In an exemplary embodiment, a content delivery network may be used as the underlying backbone or delivery mechanism; however it will be appreciated that any other network, and private and/or public infrastructure may be used. A content delivery network or content distribution network (CDN) is a system of computers containing copies of data, placed at various points in a network so as to maximize bandwidth for access to the data from clients throughout the network. A client accesses a copy of the data near to the client, as opposed to all clients accessing the same central server, so as to avoid creating a bottleneck near that server.

Content delivery networks deliver content of various types including web objects, downloadable objects (media files, software, documents), applications, real-time media streams, and other components of internet delivery (DNS, routes, and database queries).

The capacity sum of strategically placed servers can be higher than the network backbone capacity. This can result in an impressive increase in the number of concurrent users. For instance, when there is a 10 Gbit/s network backbone and 100 Gbit/s central server capacity, only 10 Gbit/s can be delivered. But when 10 servers are moved to 10 edge locations, total capacity can be 10*10 Gbit/s.

Strategically placed edge servers decrease the load on interconnects, public peers, private peers and backbones, freeing up capacity and lowering delivery costs. Such configurations use the same principle as just described and thus, instead of loading all traffic on a backbone or peer link, a CDN can offload these by redirecting traffic to edge servers.

CDNs generally deliver content over TCP and UDP connections. TCP throughput over a network is impacted by both latency and packet loss. In order to reduce both of these parameters, CDNs traditionally place servers as close to the edge networks that users are on as possible. Theoretically the closer the content the faster the delivery and the less chance of a packet being loss, although network distance may not be the factor that leads to best performance. End users will likely experience less jitter, fewer network peaks and surges, and improved stream quality—especially in remote areas. The increased reliability allows a CDN operator to deliver HD quality content with high Quality of Service, low costs and low network load.

CDNs can dynamically distribute assets to strategically placed redundant core, fallback and edge servers. CDNs can have automatic server availability sensing with instant user redirection. A CDN can offer 100% availability, even with large power, network or hardware outages.

CDN technologies give more control of asset delivery and network load. They can optimize capacity per customer, provide views of real-time load and statistics, reveal which assets are popular, show active regions and report exact viewing details to the customers. These usage details are an important feature that a CDN provider must provide, since the usage logs are no longer available at the content source server after it has been plugged into the CDN, because the connections of end-users are now served by the CDN edges instead of the content source.

Most CDNs are operated as an application service provider (ASP) on the Internet, although an increasing number of internet network owners, such as AT&T, are building their own CDN to improve on-net content delivery and to generate revenues from content customers. Some develop internal CDN software; others use commercially available software.

CDN nodes are usually deployed in multiple locations, often over multiple backbones. These nodes cooperate with each other to satisfy requests for content by end users, transparently moving content to optimize the delivery process. Optimization can take the form of reducing bandwidth costs, improving end-user performance (reducing page load times and user experience), or increasing global availability of content.

The number of nodes and servers making up CDN varies, depending on the architecture, some reaching thousands of nodes with tens of thousands of servers on many remote PoPs. Others build a global network and have a small number of geographical PoPs.

Requests for content are typically algorithmically directed to nodes that are optimal in some way. When optimizing for performance, locations that are best for serving content to the user may be chosen. This may be measured by choosing locations that are the fewest hops, the fewest number of network seconds away from the requesting client, or the highest availability in terms of server performance (both current and historical), so as to optimize delivery across local networks. When optimizing for cost, locations that are least expensive may be chosen instead.

In an optimal scenario, these two goals tend to align, as servers that are close to the end user at the edge of the network may have an advantage in performance or cost. The Edge Network is grown outward from the origin/s by further acquiring (via purchase, peering, or exchange) co-locations facilities, bandwidth and servers.

The Internet was designed according to the end-to-end principle. This principle keeps the core network relatively simple and moves the intelligence as much as possible to the network end-points: the hosts and clients. As a result the core network is specialized, simplified, and optimized to only forward data packets.

Content Delivery Networks augment the end-to-end transport network by distributing on it a variety of intelligent applications employing techniques designed to optimize content delivery. The resulting tightly integrated overlay uses web caching, server-load balancing, request routing, and content services.

Web caches store popular content on servers that have the greatest demand for the content requested. These shared network appliances reduce bandwidth requirements, reduce server load, and improve the client response times for content stored in the cache.

Server-load balancing uses one or more techniques including service based (global load balancing) or hardware based, i.e. layer 4-7 switches, also known as a web switch, content switch, or multilayer switch to share traffic among a number of servers or web caches. Here the switch is assigned a single virtual IP address. Traffic arriving at the switch is then directed to one of the real web servers attached to the switch. This has the advantages of balancing load, increasing total capacity, improving scalability, and providing increased reliability by redistributing the load of a failed web server and providing server health checks.

A content cluster or service node can be formed using a layer 4-7 switch to balance load across a number of servers or a number of web caches within the network.

Request routing directs client requests to the content source best able to serve the request. This may involve directing a client request to the service node that is closest to the client, or to the one with the most capacity. A variety of algorithms are used to route the request. These include Global Server Load Balancing, DNS-based request routing, Dynamic metafile generation, HTML rewriting, and anycasting. Proximity-choosing the closest service node—is estimated using a variety of techniques including reactive probing, proactive probing, and connection monitoring.

CDNs use a variety of methods of content delivery including, but not limited to, manual asset copying, active web caches, and global hardware load balancers.

Several protocols suites are designed to provide access to a wide variety of content services distributed throughout a content network. The Internet Content Adaptation Protocol (ICAP) was developed in the late 1990s to provide an open standard for connecting application servers. A more recently defined and robust solution is provided by the Open Pluggable Edge Services (OPES) protocol. This architecture defines OPES service applications that can reside on the OPES processor itself or be executed remotely on a Callout Server. Edge Side Includes or ESI is a small markup language for edge level dynamic web content assembly. It is fairly common for websites to have generated content. It could be because of changing content like catalogs or forums, or because of personalization.

Player Devices

A variety of player devices may be used to receive and render streaming media. In general, a player device that is compatible with the streamer must be used but, in some cases, a player device may be compatible with multiple streaming formats or, a standard format may be used. In an exemplary embodiment the FLASH PLAYER available from ADOBE SYSTEMS is used to receive and render the streaming media.

Figure 2:
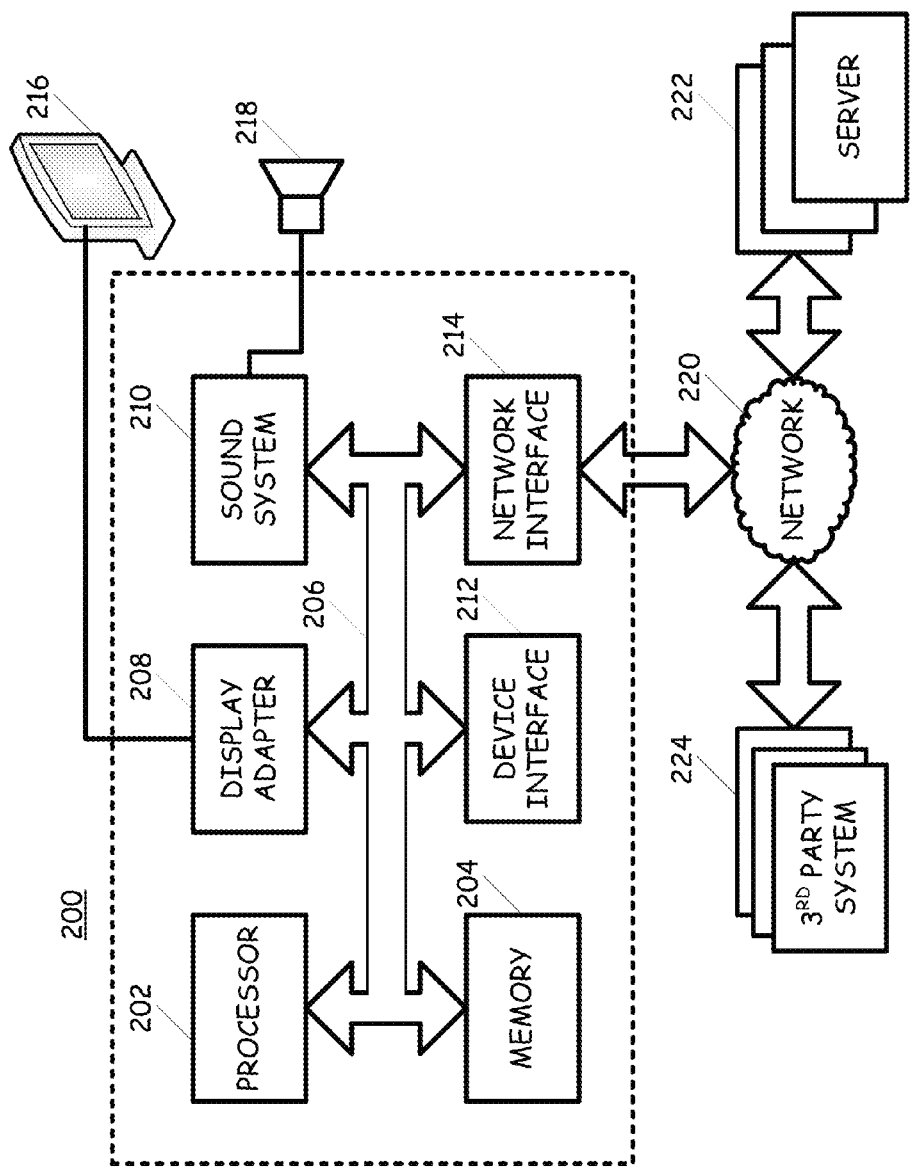
FIG. 2 is a block diagram of a computing platform that may be suitable for serving as a streamer, a platform for a player, a server or any other system necessary to implement an embodiment or create a suitable environment for the various embodiments of the video delivery system.

FIG. 2 is a block diagram of a computing platform that may be suitable for serving as a streamer, a platform for a player, a server or any other system necessary to implement an embodiment or create a suitable environment for the various embodiments of the video delivery system. It will be appreciated that not all of the components illustrated in FIG. 2 are required in all embodiments of the various systems but, each of the components are presented and described in conjunction with FIG. 2 to provide a complete and overall understanding of the components. The device or system can include a general computing platform 200 illustrated as including a processor/memory device 202/204 that may be integrated with each other or, communicatively connected over a bus or similar interface 206. The processor 202 can be a variety of processor types including microprocessors, micro-controllers, programmable arrays, custom IC's etc. and may also include single or multiple processors with or without accelerators or the like. The memory element of 204 may include a variety of structures, including but not limited to RAM, ROM, magnetic media, optical media, bubble memory, FLASH memory, EPROM, EEPROM, etc. The processor 202, or other components may also provide components such as a real-time clock, analog to digital convertors, digital to analog convertors, etc. The processor 202 also interfaces to a variety of elements including a display adapter 208, audio adapter 210, a device interface 212, and a network/device interface 214. The device interface 212 provides an interface to external devices, such as sensors, actuators, cameras, microphones, a keyboard, a mouse, a pin pad, and audio activate device, a PS3 or other game controller, as well as a variety of the many other available input and output devices or, another computer or processing device or the like. The display adapter 208 can be used to drive a variety of devices, such as display device 216 including an LED display, LCD display, one or more LEDs or other display devices as well as to receive video input from a camera. The audio adapter 210 interfaces to and drives a sound system, such as a speaker or speaker system 218 and may also interface to a microphone. The network/device interface 214 can be used to interface the computing platform 200 to other devices through a network 220. The network may be a local network, a wide area network, wireless network, a global network such as the Internet, or any of a variety of other configurations including hybrids, etc. The network/device interface 214 may be a wired interface or a wireless interface. The computing platform 200 is shown as interfacing to a server 222 and a third party system 224 through the network 220.

Figure 3:
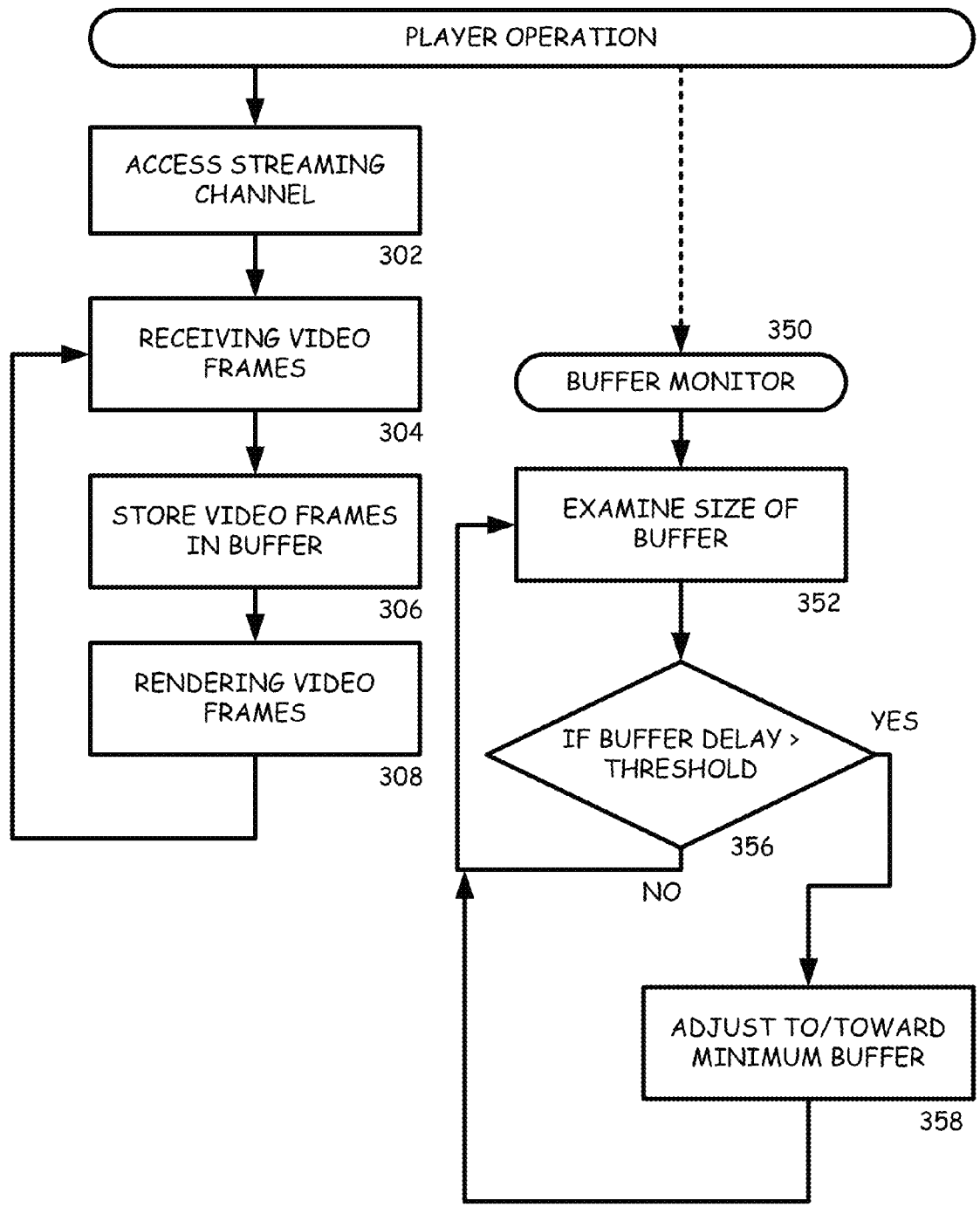
FIG. 3 is a flow diagram depicting an example of the operations performed in a typical player.

FIG. 3 is a flow diagram depicting an example of the operations performed in a typical player. Initially, the player accesses an application server to obtain setup parameters for accessing the video stream. The application server may be accessed in a variety of manners such as a user clicking on a link that represents the desired video stream. Clicking on such link may initiate the contact with the application server to obtain the setup parameters and then accessing a content delivery network server with a URL including setup parameters and the identification of the streaming channel. Ultimately, the player accesses the streaming channel 302 and begins to receive video frames from the edge of the content distribution network 304. The player then stores the video frames into a buffer and begins rendering the video frames to the user. Due to video propagation delays, latency, processing speeds and other overhead, when the video stream includes a live feed, eventually the displayed content will lag behind the live content. Thus, the video delivery system described herein includes a buffer monitor 350 within the player or operating in conjunction with the player. The buffer monitor examines the size of the buffer 352 to identify how much lag there is in the presently rendered video. If the lag is more than a threshold amount 356, such as 0.6 seconds in some embodiments or 0.5 to 0.9 seconds in other embodiments, or approximately 1 second or less in still other embodiments, then the buffer monitor takes or initiates actions to adjust the buffer to a minimum amount 358. Otherwise, the buffer monitor continues to examine the buffer size 352. In some embodiments, the adjustment step 358 may simply include a fast forward to the last frame in the buffer. In such an embodiment, the local buffer storing the media can simply be used in by-passing or fast forwarding through blocks of data or, data in a remote buffer may likewise be bypassed. In other embodiments, this may include flushing the local and/or remote buffer and receiving newer content from the content delivery network. In some embodiments, this adjustment may be made in a single step whereas in other embodiments, the adjustment may be more gradual. In this latter embodiment, the threshold level may be selected to be a lower level to ensure more current delivery of the video content.

Integration

The various embodiments of the video delivery system may be integrated into a variety of settings. For instance, most interactive content delivery systems could benefit from the described embodiments, including but not limited to conference calls, performance of remote procedures, participating remotely in live events such as auctions, etc.

A particular integration is described for remote participation in a live auction by examination of the ONLINE RINGMAN system produced and market by XCIRA. ONLINE RINGMAN is a system that enables remote bidders to participate along with in-the-lane bidders at a live auction as though there were there with the other bidders and interacting with the auctioneer. When a new event is to commence, the event is posted in the ONLINE RINGMAN by defining and presenting a unique identifier for the event. The bidding device, which is an end user device for remotely participating in the auction initiates a connection to the ONLINE RINGMAN system. In the exemplary embodiment, this process can then include initiating a connection to a stream associated with the event. Initiating the connection may include accessing an application server to obtain parameters regarding the streaming channel, such as the type of content (audio, video, data, audio and video, etc.), the sample rate for the audio, the frames per second of video, block size of data, etc. This information, as well as other information can be obtained from a series of tables existing on the application server or otherwise available through the application server.

In some embodiments, the bidder device is simply a web-based browser window with an embedded player. The bidder device then passes a URL with specific parameters to the CDN in the form of a request to connect. The URL specifically identifies the feed from the ONLINE RINGMAN system. The bidder device then begins to receive and render the bidding information, as well as the audio/video received from the streaming channel. The buffer monitor within the bidder device then monitors the buffer size and, if the presented video lags the live video by the threshold amount, the bidder device catches-up the video.

Thus, integrated into such an environment, the real-time video delivery system enables remote bidders to participate in a live auction and, to receive real-time, or substantially real-time audio and video feeds from the auction floor. If the audio/video being presented to the remote bidder on the bidding device begins to lag the action on the auction floor, this is detected and the buffer is flushed to enable to delivery of real-time audio/video with minimal delay (i.e., approximately one second or less and preferably much less than a second). Advantageously, the remote bidders can then participate in the auctioning event as though they were there present. The viewer may from time to time witness a jump in the video as the presented content is caught-up with the live feed but, the sacrifice of quality to remain current is certainly more desired in such an environment.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A method for presenting live media content in substantially real-time, the method comprising the steps of:
   receiving, at a rendering device, media content from a live feed over a content delivery network, wherein the media content includes video content delivered in blocks of video data and the media content is rendered on the rendering device at least in part by an ADOBE FLASH PLAYER video player operating on the rendering device;
   buffering the media content as it is received, thereby generating a quantity of buffered media content;
   rendering the buffered media content on the rendering device in the order of its receipt from the live feed; and
   skipping over a portion of the buffered media content when a quantity of the buffered media content exceeds a threshold quantity by:
   monitoring the number of video blocks that are stored in the buffer;
   detecting when the number of video blocks in the buffer substantially equals the threshold quantity; and
   jumping ahead to the most recent video blocks before continuing the step of rendering the media content from the most recent video block by issuing a seek command to the content delivery network.

2. The method of claim 1, wherein the step of detecting when the number of video blocks in the buffer substantially equals the threshold quantity further comprises detecting when the buffer includes approximately 0.6 or more seconds of video blocks.

3. The method of claim 2, wherein the step of issuing the seek command includes issuing a seek command with parameters that will cause the buffer to contain approximately 0.2 seconds or less of video blocks.

* * * * *